(12) United States Patent
Tamanaha et al.

(10) Patent No.: US 12,142,057 B2
(45) Date of Patent: Nov. 12, 2024

(54) INFORMATION RECORDING DEVICE, INFORMATION RECORDING METHOD, AND STORAGE MEDIUM

(71) Applicant: HONDA MOTOR CO., LTD., Tokyo (JP)

(72) Inventors: Ryusuke Tamanaha, Tokyo (JP); Hodaka Kaneda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 285 days.

(21) Appl. No.: 17/667,571

(22) Filed: Feb. 9, 2022

(65) Prior Publication Data

US 2022/0262131 A1  Aug. 18, 2022

(30) Foreign Application Priority Data

Feb. 12, 2021  (JP) .................................. 2021-020741

(51) Int. Cl.
*G06V 20/58*  (2022.01)
*B60W 10/04*  (2006.01)
(Continued)

(52) U.S. Cl.
CPC ............. *G06V 20/58* (2022.01); *B60W 10/04* (2013.01); *B60W 10/18* (2013.01); *B60W 10/20* (2013.01); *G06V 20/59* (2022.01); *H04N 23/90* (2023.01); *B60W 2420/403* (2013.01); *B60W 2520/06* (2013.01); *B60W 2520/10* (2013.01); *B60W 2540/00* (2013.01); *B60W 2554/4041* (2020.02);
(Continued)

(58) Field of Classification Search
CPC ...... B60W 10/04; B60W 10/18; B60W 10/20; B60W 2420/403; B60W 2520/06; B60W 2520/10; B60W 2540/00; B60W 2554/4041; B60W 2554/802; G06V 20/58; G06V 20/59; G06V 2201/08; H04N 23/60; H04N 23/90; H04N 7/183
See application file for complete search history.

(56) References Cited

U.S. PATENT DOCUMENTS 11,312,378 B2 *  4/2022  Saigusa ................. B60W 30/16
11,749,105 B2 *  9/2023  Kathuria ................ G08G 1/166
340/902
(Continued)

FOREIGN PATENT DOCUMENTS

| JP | 2020-160630 |   | 10/2020 |
| JP | 2020160630 A | * | 10/2020 |
| JP | 2022063068 A | * | 4/2022 |

*Primary Examiner* — Babar Sarwar
(74) *Attorney, Agent, or Firm* — Amin, Turocy & Watson, LLP

(57) ABSTRACT

An information recording device includes: an image acquirer configured to acquire an image which is captured by an imager mounted in a host vehicle to perform a first function; a tailgating determiner configured to determine whether the host vehicle is being tailgated by another vehicle on the basis of the image acquired by the image acquirer; an imaging controller configured to cause the imager to capture an image of surroundings of the host vehicle as a function other than the first function when the tailgating determiner determines that the host vehicle is being tailgated by the other vehicle; and a storage controller configured to store the image captured by the imager in a storage.

8 Claims, 9 Drawing Sheets

(51) Int. Cl.
    *B60W 10/18*     (2012.01)
    *B60W 10/20*     (2006.01)
    *G06V 20/59*     (2022.01)
    *H04N 23/90*     (2023.01)

(52) U.S. Cl.
    CPC ............... *B60W 2554/802* (2020.02); *G06V 2201/08* (2022.01)

(56) References Cited

U.S. PATENT DOCUMENTS

| | | | |
|---|---|---|---|
| 2003/0052969 A1* | 3/2003 | Satoh | B60R 1/26 348/148 |
| 2006/0028328 A1* | 2/2006 | Cresse | G01S 17/931 342/72 |
| 2012/0166057 A1* | 6/2012 | Amato | B60K 31/0058 701/96 |
| 2013/0057397 A1* | 3/2013 | Cutler | G08G 1/167 701/25 |
| 2013/0076007 A1* | 3/2013 | Goode | B60R 1/003 348/148 |
| 2018/0037227 A1* | 2/2018 | D'Sa | B60W 30/16 |
| 2018/0197415 A1* | 7/2018 | Kurata | G08G 1/166 |
| 2018/0300899 A1* | 10/2018 | Dreuw | H04N 17/002 |
| 2018/0345961 A1* | 12/2018 | Saigusa | G08G 1/166 |
| 2019/0210616 A1* | 7/2019 | Watkins | B60Q 1/50 |
| 2021/0037217 A1* | 2/2021 | Tanimori | B60K 35/00 |
| 2022/0165073 A1* | 5/2022 | Shikii | B60W 40/09 |
| 2022/0169285 A1* | 6/2022 | Griffin | B60W 30/182 |
| 2023/0303065 A1* | 9/2023 | Cho | B60W 30/182 |

\* cited by examiner

INFORMATION RECORDING DEVICE, INFORMATION RECORDING METHOD, AND STORAGE MEDIUM

CROSS-REFERENCE TO RELATED APPLICATION

Priority is claimed on Japanese Patent Application No. 2021-020741, filed Feb. 12, 2021, the content of which is incorporated herein by reference.

BACKGROUND

Field of the Invention

The present invention relates to an information recording device, an information recording method, and a storage medium.

Description of Related Art

In the related art, a technique of determining various tailgating motions of a following vehicle on the basis of a horn sound or an image captured by a dedicated camera for detecting a tailgating motion (a tailgating operation) and recording the sound or the image on the basis of the result of determination is known (for example, see Japanese Unexamined Patent Application, First Publication No. 2020-160630).

SUMMARY

However, in the related art, since a dedicated camera for detecting a tailgating motion needs to be mounted in a vehicle, there is a likelihood that device costs will increase. It may not be possible to appropriately determine whether a host vehicle is being tailgated by another vehicle (whether another vehicle is performing a tailgating operation) using only a camera for capturing a rearview image.

An aspect of the present invention was made in consideration of the aforementioned circumstances and an objective thereof is to provide an information recording device, an information recording method, and a storage medium that can decrease device costs and appropriately determine whether a host vehicle is being tailgated.

An information recording device, an information recording method, and a storage medium according to the present invention employ the following configurations.

(1) An information recording device according to an aspect of the present invention is an information recording device including: an image acquirer configured to acquire an image which is captured by an imager mounted in a host vehicle to perform a first function; a tailgating determiner configured to determine whether the host vehicle is being tailgated by another vehicle on the basis of the image acquired by the image acquirer; an imaging controller configured to cause the imager to capture an image of surroundings of the host vehicle as a function other than the first function when the tailgating determiner determines that the host vehicle is being tailgated by the other vehicle; and a storage controller configured to store the image captured by the imager in a storage.

(2) In the aspect of (1), the first function may be a function of detecting an occupant state in the host vehicle.

(3) In the aspect of (1), the first function may be a function of detecting at least another vehicle which is present in a blind spot of the host vehicle.

(4) In the aspect of (3), the tailgating determiner may be configured to, when the function of detecting another vehicle which is present in the blind spot is achieved by a plurality of imagers mounted in the host vehicle, determine whether the host vehicle is being tailgated by the other vehicle depending on whether the other vehicle appears in each of images captured by the plurality of imagers.

(5) In the aspect of (1), the first function may be a function of detecting a rear object when the host vehicle moves in reverse.

(6) In the aspect of (1), the host vehicle may include a driving controller configured to control one or both of steering and acceleration/deceleration, and the first function may be a function of detecting an object near the host vehicle such that the driving controller performs driving control.

(7) In the aspect of (1), the tailgating determiner may be configured to determine whether the host vehicle is being tailgated by another vehicle when a speed of the host vehicle is equal to or higher than a predetermined speed.

(8) In the aspect of (1), the tailgating determiner may be configured to, when a first other vehicle is present in front of the host vehicle and a second other vehicle is present behind the host vehicle, determine whether the host vehicle is being tailgated on the basis of a difference between a distance between the host vehicle and the first other vehicle and a distance between the host vehicle and the second other vehicle.

(9) In the aspect of (1), the tailgating determiner may be configured to, when another vehicle is present in front of the host vehicle, determine whether the host vehicle is being tailgated by the other vehicle on the basis of a rate of change of a load applied to front wheels of the host vehicle or a rate of change of steering of the host vehicle.

(10) According to another aspect of the present invention, there is provided an information recording method that is performed by a computer, the information recording method including: acquiring an image which is captured by an imager mounted in a host vehicle to perform a first function; determining whether the host vehicle is being tailgated by another vehicle on the basis of the acquired image; causing the imager to capture an image of surroundings of the host vehicle as a function other than the first function when it is determined that the host vehicle is being tailgated by the other vehicle; and storing the image captured by the imager in a storage.

(11) According to another aspect of the present invention, there is provided a non-transitory computer-readable storage medium that stores a program causing a computer to perform: acquiring an image which is captured by an imager mounted in a host vehicle to perform a first function; determining whether the host vehicle is being tailgated by another vehicle on the basis of the acquired image; causing the imager to capture an image of surroundings of the host vehicle as a function other than the first function when it is determined that the host vehicle is being tailgated by the other vehicle; and storing the image captured by the imager in a storage.

According to the aspects of (1) to (11), it is possible to decrease device costs and to appropriately determine whether a host vehicle is tailgated.

DESCRIPTION OF EMBODIMENTS

Hereinafter, an information recording device, an information recording method, and a storage medium according to an embodiment of the present invention will be described with reference to the accompanying drawings. It is assumed that the information recording device according to the embodiment is mounted in a vehicle. The vehicle which is used in this embodiment may be, for example, a vehicle with two wheels, three wheels, or four wheels and a drive source thereof may be an internal combustion engine such as a diesel engine or a gasoline engine, an electric motor, or a combination thereof. The electric motor operates using electric power which is generated by a power generator connected to the internal combustion engine or electric power which is discharged from a battery (a storage battery) such as a secondary battery or a fuel cell.

Overall Configuration

Figure 1:
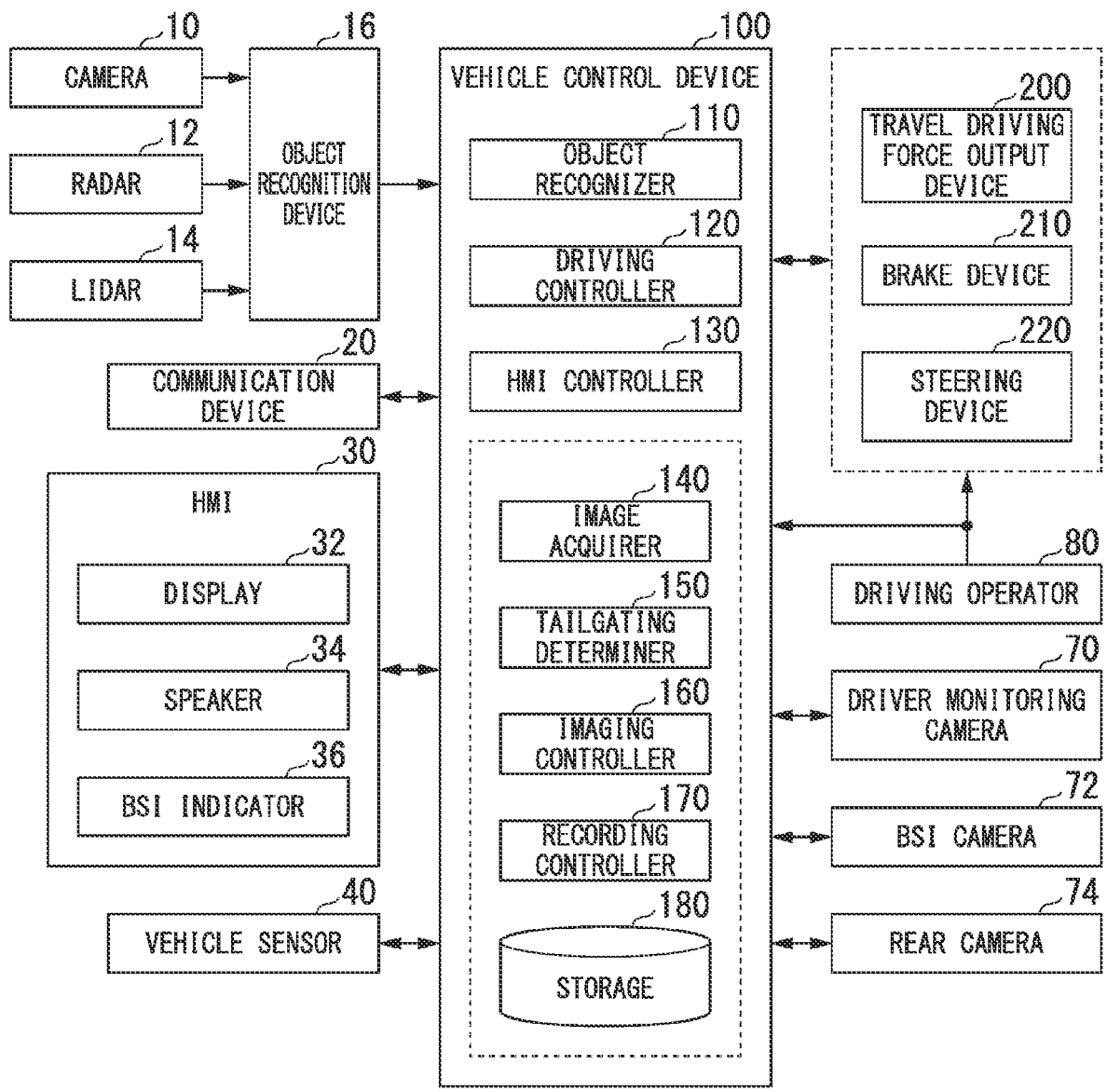
FIG. 1 is a diagram illustrating an example of a configuration of a vehicle system in which an information recording device according to an embodiment is mounted.

FIG. 1 is a diagram illustrating an example of a configuration of a vehicle system 1 in which the information recording device according to the embodiment is mounted. The vehicle system 1 illustrated in FIG. 1 includes, for example, a camera 10, a radar 12, a Light Detection and Ranging (LiDAR) device 14, an object recognition device 16, a communication device 20, a human-machine interface (HMI) 30, a vehicle sensor 40, a navigation device 50, a driver monitoring camera 70, a BSI camera 72, a rear camera 74, a driving operator 80, a vehicle control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto. The camera 10 is an example of a "first camera." The driver monitoring camera 70 is an example of a "second camera." The BSI camera 72 is an example of a "third camera." The rear camera 74 is an example of a "fourth camera." The cameras are an example of an "imager."

The camera 10 is, for example, a digital camera using a solid-state imaging device such as a charge coupled device (CCD) or a complementary metal oxide semiconductor (CMOS). One or more cameras 10 are attached to an arbitrary position on a vehicle in which the vehicle system 1 is mounted (hereinafter referred to as a host vehicle M). For example, when the front view of the host vehicle M is imaged, the camera 10 is attached to an upper part of a front windshield, a rear surface of a rearview mirror, or the like. When the rearview of the host vehicle M is imaged, the camera 10 is attached to an upper part of a rear windshield, a backdoor, or the like. When the side view and the side rearview of the host vehicle M is imaged, the camera 10 is attached to a door mirror or the like. The camera 10 images the surroundings of the host vehicle M, for example, periodically and repeatedly. The camera 10 may be a stereoscopic camera.

The radar 12 radiates radio waves such as millimeter waves to the surroundings of the host vehicle M, detects radio waves (reflected waves) reflected by an object, and detects at least a position (a distance and a direction) of the object. One or more radars 12 are attached to an arbitrary position on the host vehicle M. The radar 12 may detect a position and a speed of an object using a frequency modulated continuous wave (FM-CW) method.

The LIDAR 14 radiates light to the surroundings of the host vehicle M and measures scattered light. The LIDAR 14 detects a distance to an object on the basis of a time from radiation of light to reception of light. The radiated light is, for example, a pulse-like laser beam. The LIDAR 14 is attached to an arbitrary position on the host vehicle M.

The object recognition device 16 performs a sensor fusion process on results of detection from some or all of the camera 10, the radar 12, and the LIDAR 14 and recognizes a position, a type, a speed, and the like of an object near the host vehicle M. Examples of the object include another vehicle (for example, a nearby vehicle present within a predetermined distance from the host vehicle M), a pedestrian, a bicycle, and a road structure. Examples of the road structure include road markings, traffic signals, curbstones, medians, guard rails, fences, walls, and crossings. Examples of the road structure include road markings such as road marking lines drawn on or added to road surfaces, crosswalks, bicycle crossings, and stop lines. When marking lines are recognized, the object recognition device 16 may recognize types of the lines (for example, a solid line, a dotted line, a double line, and a color). The object recognition device 16 outputs the results of recognition to the vehicle control device 100. The object recognition device 16 may output the results of detection from the camera 10, the radar 12, and the LIDAR 14 to the vehicle control device 100 without any change. In this case, the object recognition device 16 may be omitted from the configuration of the vehicle system 1. The object recognition device 16 may be included in the vehicle control device 100.

The communication device 20 communicates with, for example, other vehicles near the host vehicle M, a terminal device of a user who uses the host vehicle M, or various server devices, for example, using a network such as a cellular network, a Wi-Fi network, Bluetooth (registered trademark), dedicated short range communication (DSRC), a local area network (LAN), a wide area network (WAN), or the Internet.

The HMI 30 presents various types of information to an occupant of the host vehicle M and receives an input operation from the occupant. For example, the HMI 30 includes a display 32, a speaker 34, and a blind spot information (BSI) indicator 36. The HMI 30 may include buzzers, a touch panel, switches, keys, and microphones.

The display 32 is provided, for example, in an instrument panel which is located below a front windshield and installed in front of a driver's seat and a passenger's seat in a cabin. For example, the display 32 may be provided in the vicinity of a position in front of the driver's seat (a seat closest to a steering wheel) and installed at a position which is visible by an occupant through a gap of the steering wheel or over the steering wheel.

For example, the display 32 may be various display devices such as a liquid crystal display (LCD) and an organic electroluminescence (EL) display. The display 32 displays an image output from an HMI controller 130. The display 32 may be a touch panel that receives an occupant's operation on a screen. The display 32 may serve as an instrument panel (a meter display) that displays meters such as a speed meter or a tachometer.

At least one speaker 34 is provided in the cabin. The speaker 34 outputs sound, warning sound, or the like, for example, under the control of the HMI controller 130.

The BSI indicator 36 displays a predetermined image, for example, in a part of a mirror surface of a door mirror of the host vehicle M. The door mirror is provided, for example, in each of a door closest to the driver's seat and a door closest to the passenger's seat. The door mirror is used for a driver or the like to ascertain the side view and the rearview of the host vehicle M via the mirror surface. The predetermined image is, for example, an image for notifying an occupant that an object is present in a predetermined range centered on the host vehicle M. An image indicating that an object (for example a nearby vehicle) is present in a predetermined range centered on the host vehicle M is displayed in a part of the mirror surface of the door mirror. The image may be displayed on the display 32 instead of (or in addition to) the door mirror.

The vehicle sensor 40 includes a vehicle speed sensor that detects a speed of the host vehicle M, an acceleration sensor that detects an acceleration, a yaw rate sensor that detects a yaw rate (for example, a rotational angular velocity around a vertical axis passing through the center of gravity of the host vehicle M), and a direction sensor that detects a direction of the host vehicle M. The vehicle sensor 40 may include a position sensor that detects a position of the host vehicle M. The position sensor may be, for example, a sensor that acquires position information (longitude and latitude information) from a global positioning system (GPS) device. The position sensor may be, for example, a sensor that acquires position information using a global navigation satellite system (GNSS) receiver. The vehicle sensor 40 may include, for example, a load sensor that detects a load applied to front wheels or rear wheels of the host vehicle M or a steering sensor that detects an amount of steering of the host vehicle M. A result of detection from the vehicle sensor 40 is output to the vehicle control device 100.

The driver monitoring camera 70 is, for example, a digital camera using a solid-state imaging device such as a CCD or a CMOS. The driver monitoring camera 70 is attached to an arbitrary position on the host vehicle M in a place and a direction in which the head of a driver sitting on a driver's seat or an occupant sitting on a passenger's seat or a rear seat in the host vehicle M can be imaged from the front (such that the face of the driver or occupant is imaged). For example, the driver monitoring camera 70 is attached to an upper part of a display device which is provided at the central part of an instrument panel of the host vehicle M, an upper part of a front windshield, a room mirror, or the like. An image captured by the driver monitoring camera 70 includes an area of an image acquired by imaging the outside through a side windshield or a rear windshield. The driver monitoring camera 70 captures an image including the cabin, for example, periodically and repeatedly.

The BSI camera 72 is, for example, a digital camera using a solid-state imaging device such as a CCD or a CMOS. For example, the BSI camera 72 images a blind zone (a blind spot) of a driver such as a side view or a side rearview of the host vehicle M. The BSI camera 72 is attached to, for example, a door mirror or a vicinity of a door mirror. The BSI camera 72 may be attached to a rear side of the vehicle body of the host vehicle M. The BSI camera 72 images a side view or a side rearview of the host vehicle M, for example, periodically and repeatedly. The BSI camera 72 may operate when it is predicted by an occupant's operation of a direction indicator lever that the occupant changes a travel lane of the host vehicle M.

The rear camera 74 is, for example, a digital camera using a solid-state imaging device such as a CCD or a CMOS. For example, the rear camera 74 operates when the host vehicle M moves in reverse (rearward) and images a rearview of the host vehicle M. The rear camera 74 is attached to, for example, an upper part of a rear windshield or an upper part of the rear side of the vehicle body of the host vehicle M. The rear camera 74 images a side view or a side rearview of the host vehicle M periodically and repeatedly when it is operating.

The driving operator 80 includes, for example, a steering wheel on which an occupant performs a steering operation, an accelerator pedal, a brake pedal, a direction indicator lever that operates a direction indicator (a blinker), a shift lever, and other operators. For example, an operation detector that detects an amount of operation of an operation performed by an occupant is attached to each operator of the driving operator 80. The operation detector detects a position of the direction indicator, an amount of depression of the accelerator pedal or the brake pedal, a position of the shift lever, or a steering angle or a steering torque of the steering wheel. The operation detector outputs a detection signal indicating a result of detection thereof to the vehicle control device 100 and some or all of the travel driving force output device 200, the brake device 210, and the steering device 220.

The travel driving force output device 200, the brake device 210, and the steering device 220 will be first described below before the vehicle control device 100 will be described. The travel driving force output device 200 outputs a travel driving force (a torque) for allowing the host vehicle M to travel to the driving wheels. The travel driving force output device 200 includes, for example, a combination of an internal combustion engine, an electric motor, and a transmission and a power electronic control unit (ECU) that controls them. The power ECU controls the aforementioned elements on the basis of information input from the vehicle control device 100 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the vehicle control device 100 or the information input from the driving operator 80 such that a brake torque based on a braking operation is output to vehicle wheels. The brake device 210 may include a mechanism for transmitting a hydraulic pressure generated by an operation of the brake pedal included in the driving operator 80 to the cylinder via a master cylinder as a backup. The brake device 210 is not limited to the above-mentioned configuration, and may be an electronically controlled hydraulic brake device that controls an actuator on the basis of the information input from the vehicle control device 100 such that the hydraulic pressure of the master cylinder is transmitted to the cylinder.

The steering device 220 includes, for example, a steering ECU and an electric motor. The electric motor changes a direction of the turning wheels, for example, by applying a force to a rack-and-pinion mechanism. The steering ECU drives the electric motor on the basis of the information input from the vehicle control device 100 or the information input from the driving operator 80 to change the direction of the turning wheels.

Configuration of Vehicle Control Device

The vehicle control device 100 includes, for example, an object recognizer 110, a driving controller 120, an HMI controller 130, an image acquirer 140, a tailgating determiner 150, an imaging controller 160, a storage controller 170, and a storage 180. The object recognizer 110, the driving controller 120, the HMI controller 130, the image acquirer 140, the tailgating determiner 150, the imaging controller 160, and the storage controller 170 are realized, for example, by causing a hardware processor such as a central processing unit (CPU) to execute a program (software). Some or all of such functional elements may be realized in hardware (which includes circuitry) such as a large scale integration (LSI) circuit, an application-specific integrated circuit (ASIC), a field-programmable gate array (FPGA), or a graphics processing unit (GPU) or may be realized in cooperation of software and hardware. The program may be stored in a storage device such as an HDD or a flash memory (a storage device including a non-transitory storage medium) of the vehicle control device 100 in advance, or may be installed in the storage device of the vehicle control device 100 by storing the program in a removable storage medium such as a DVD, a CD-ROM, or a memory card and putting the removable storage medium (a non-transitory storage medium) to a drive device, a card slot, or the like. The image acquirer 140, the tailgating determiner 150, the imaging controller 160, the storage controller 170, and the storage 180 are an example of an "information recording device." The whole configuration or a partial configuration of the information recording device may be configured as a unit separate from the vehicle control device 100.

The storage 180 may be realized by the aforementioned various storage devices or a solid state drive (SSD), an electrically erasable programmable read only memory (EEPROM), a read only memory (ROM), or a random access memory (RAM). For example, information required for performing a tailgating determining process or an information recording process in this embodiment such as map information or a program, an image captured by at least one of first to fourth cameras, various types of other information, and the like are stored in the storage 180.

The object recognizer 110 recognizes an object near the host vehicle M on the basis of information input from the camera 10, the radar 12, and the LIDAR 14 via the object recognition device 16. For example, an area near the host vehicle M is an area within a predetermined distance from a point serving as a reference (for example, the center or the center of gravity of the host vehicle M) of the host vehicle M. The area near the host vehicle M may be set on the basis of detectable ranges of the camera 10, the radar 12, and the LIDAR 14.

The object recognizer 110 recognizes a position, a shape, a size, an area, or the like of an object. When the object is another vehicle, the object recognizer 110 recognizes states such as a position, a speed, and an acceleration of the other vehicle. A position of the other vehicle may be expressed as a representative point such as the center of gravity or a corner of the other vehicle or may be expressed as an area drawn by an outline of the other vehicle. A "state" of another vehicle may include an acceleration or a jerk of the other vehicle or a "movement state" (for example, whether lane change is being performed or whether lane change is going to be performed) thereof.

The object recognizer 110 recognizes a lane (a travel lane) in which the host vehicle M is traveling on the basis of information input from the camera 10, the radar 12, and the LIDAR 14 via the object recognition device 16. For example, the object recognizer 110 analyzes an image captured by the camera 10, extracts edge points with a large luminance difference with neighboring pixels in the image, and recognizes a road marking line on an image plane by connecting the edge points. The object recognizer 110 may recognize a road marking line correlated with a road on which the host vehicle M is traveling with reference to map information stored in the storage 180 on the basis of the position information of the host vehicle M acquired by the vehicle sensor 40. The object recognizer 110 may recognize a road marking line with higher accuracy by comparing the road marking line acquired from the map information with a road marking line recognized on the basis of the image captured by the camera 10. The object recognizer 110 recognizes the travel lane on the basis of right and left road marking lines of the host vehicle M. The object recognizer 110 may recognize the travel lane by recognizing travel road boundaries (road boundaries) including the road marking lines, edges of roadsides, curbstones, medians, and guard rails. The object recognizer 110 may recognize information on a neighboring lane adjacent to the travel lane or a road shape. The object recognizer 110 may recognize a stop line, an obstacle, a red signal, a toll gate, or other road events.

The object recognizer 110 may recognize a position or a posture of the host vehicle M relative to a travel lane at the time of recognition of the travel lane. The object recognizer 110 may recognize, for example, a deviation of a reference point of the host vehicle M from the lane center and an angle of the travel direction of the host vehicle M with respect to a line formed by connecting the lane centers as the position and the posture of the host vehicle M relative to the travel lane. Instead, the object recognizer 110 may recognize a position of the reference point of the host vehicle M relative to one side line of the travel lane (a road marking line or a road boundary) as the position of the host vehicle M relative to the travel lane.

The driving controller 120 controls one or both of steering and acceleration/deceleration of the host vehicle M on the basis of the result of recognition from the object recognizer 110 such that the host vehicle M travels. For example, the driving controller 120 performs driving control such as adaptive cruise control (ACC) or lane keeping assist system (LKAS) in accordance with an instruction from an occupant. The driving controller 120 performs driving control for avoiding contact with another vehicle or the like.

The HMI controller 130 notifies an occupant of predetermined information using the HMI 30. The predetermined information includes, for example, information associated with travel of the host vehicle M. The information associated with travel of the host vehicle M includes, for example, a speed, an engine rotation speed, a shift position, and the like of the host vehicle M. The predetermined information may include, for example, information on a current position or a destination of the host vehicle M and an amount of residual fuel. The predetermined information may include information not associated with travel of the host vehicle M such as television programs or contents (for example, movies) stored in a storage medium such as a DVD.

When the tailgating determiner 150 determines that the host vehicle M is being tailgated by another vehicle, the HMI controller 130 displays an image indicating that the host vehicle M is being tailgated or an image indicating that a captured image is to be recorded on the display 32 or outputs sound indicating that the host vehicle M is being tailgated from the speaker 34. The HMI controller 130 notifies an occupant of presence of an object by displaying an image indicating presence of another vehicle on the door mirror or the like of the host vehicle M using the BSI indicator 36 when it is determined on the basis of the result of recognition from the object recognizer 110 that the other vehicle is present in a blind spot in the side view or the side rearview of the host vehicle M.

The HMI controller 130 may notify an occupant (a driver) by vibration by operating a vibration sensor (not illustrated) provided in the steering wheel or a vibration sensor (not illustrated) provided in the driver's seat instead of (in addition to) display of an image or output of sound.

The HMI controller 130 may acquire information received by the HMI 30 and output the acquired information to the driving controller 120, the information recording device, the communication device 20, or the like. The HMI controller 130 may transmit various types of information which are output by the HMI 30 to a terminal device which is used by a user (an occupant) of the host vehicle M via the communication device 20. The terminal device may be, for example, a smartphone or a tablet terminal.

The image acquirer 140 acquires an image captured by a camera (the first to fourth cameras) mounted in the host vehicle M to achieve a first function. The first function is, for example, a function required for driving of the host vehicle M. For example, driving of the host vehicle M includes driving control using the driving controller 120 or driving support of a driver's manual driving. For example, the first function of the camera (the first camera) 10 is a function of detecting an object near the host vehicle M to perform driving control using the driving controller 120. The first function of the driver monitoring camera (the second camera) 70 is, for example, a function of detecting an occupant state of the host vehicle M. The first function of the BSI camera (the third camera) 72 is, for example, a function of detecting at least another vehicle present in a blind spot in a side view or a side rearview of the host vehicle M. The first function of the rear camera (the fourth camera) 74 is, for example, a function of detecting a rear object when the host vehicle M moves in reverse.

The tailgating determiner 150 determines whether the host vehicle M is being tailgated by another vehicle (that is, whether another vehicle is performing an operation of tailgating the host vehicle M), for example, using images captured by the camera (the first to fourth cameras) mounted in the host vehicle M to achieve the first function. The tailgating operation is, for example, a driving operation for hindering travel of the host vehicle M or a driving operation for causing a risk of a car accident on a road. For example, the tailgating operation includes driving operations of traveling in a state of being close to the host vehicle M, performing a motion of flashing a headlight or ringing a horn more than necessary, and performing sudden deceleration on the forward side more than necessary. Details of the function of the tailgating determiner 150 will be described later.

The imaging controller 160 operates predetermined cameras mounted in the host vehicle M for the purpose of achieving the first function of each camera. When the tailgating determiner 150 performs a determination process based on determination patterns which will be described later or when the tailgating determiner 150 determines that the host vehicle M is being tailgated by another vehicle, the imaging controller 160 operates the predetermined cameras for a purpose other than the first function (for the purpose of imaging the other vehicle performing the tailgating operation). For example, the imaging controller 160 operates a camera having a viewing angle capable of imaging the other vehicle on the basis of the position of the other vehicle determined to be performing the tailgating operation out of the first to fourth cameras, and causes the camera to capture an image including the surroundings of the host vehicle M for a purpose other than the first function.

Before or after determination is performed by the tailgating determiner 150, the imaging controller 160 may operate all the first to fourth cameras. The imaging controller 160 may selectively operate the cameras for capturing an image on the basis of a pattern with which the host vehicle M is determined to be being tailgated by another vehicle out of determination patterns used by the tailgating determiner 150 which will be described later. In this case, the imaging controller 160 operates, for example, at least the camera which has captured an image used to perform determination based on the determination pattern.

The storage controller 170 temporarily stores images captured by the first to fourth cameras in an internal memory or the like. When the tailgating determiner 150 determines that the host vehicle M is being tailgated by another vehicle, the storage controller 170 stores an image including the other vehicle by which the host vehicle M is determined to be being tailgated and which has been captured under the control of the imaging controller 160 in the storage 180. For example, the storage controller 170 stores an image within a predetermined period before and after a time point at which the tailgating determiner 150 has determined that the host vehicle M is being tailgated in the storage 180. In this case, the storage controller 170 may set the predetermined period to be variable on the basis of the pattern used to determine that the host vehicle M is being tailgated by another vehicle out of the determination patterns used by the tailgating determiner 150 which will be described later or may set the predetermined period to be fixed regardless of the patterns. When it is determined that the other vehicle continues to perform the tailgating operation, the storage controller 170 may adjust the length of the predetermined period according to the duration time.

The storage controller 170 may adjust the length of the predetermined period according to an available capacity of the storage 180. When the available capacity is equal to or less than a predetermined value, the storage controller 170 may thin images captured by the cameras or decrease resolutions of the images and then store the resultant images in the storage 180. Accordingly, it is possible to store images in a longer time by decreasing a data volume to be stored.

The storage controller 170 may transmit the images stored in the storage 180 to a server device or the like via the communication device 20 in a predetermined cycle or at predetermined timings. When the captured images can be normally transmitted to the server device or the like, the storage controller 170 may delete data which has been transmitted from the storage 180. Accordingly, it is possible to successively secure an available capacity.

The storage controller 170 may extract feature information of another vehicle included in an image or an image of a number plate of the other vehicle or a face area of an occupant of the other vehicle and store the extracted information as other vehicle information in the storage 180.

Function of Tailgating Determiner

A process of determining whether the host vehicle M is being tailgated by another vehicle using an image captured by at least one of the cameras (the first to fourth cameras) mounted in the host vehicle M, which is performed by the tailgating determiner 150, will be described below divisionally in several determination patterns. The process based on each determination pattern may be performed at a predetermined timing or repeatedly in a predetermined cycle. The tailgating determiner 150 may store the result of determination of each cycle in the storage 180 or an internal memory. The results of determination corresponding to predetermined cycles (for example, about 10 to 100 cycles) are stored in the storage 180 or the internal memory, and unnecessary data is erased.

First Determination Pattern

A first determination pattern is a pattern for determining whether the host vehicle M is being tailgated by another vehicle, for example, using an image captured by the driver monitoring camera 70.

Figure 2:
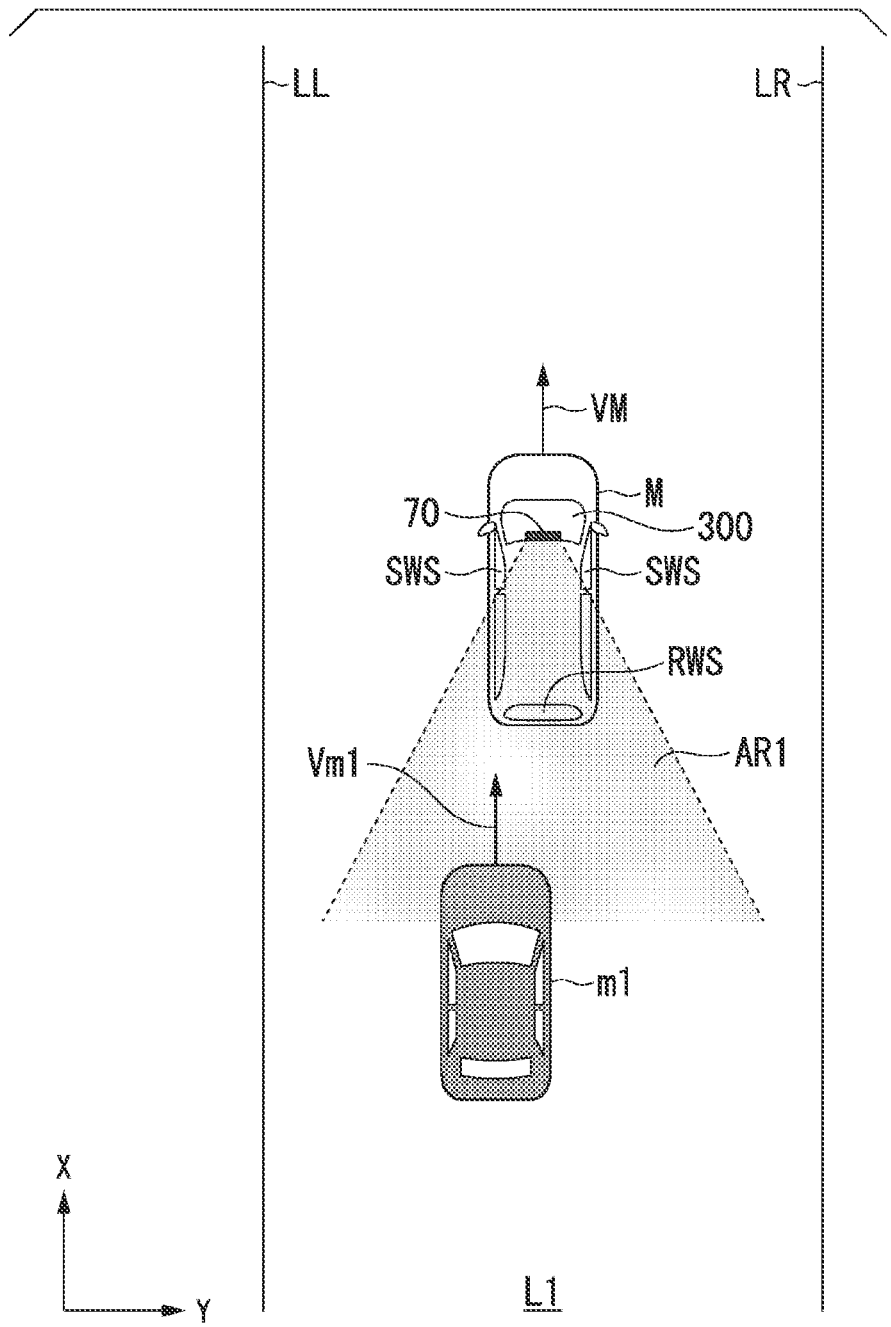
FIG. 2 is a diagram illustrating a first determination pattern in a tailgating determiner.

FIG. 2 is a diagram illustrating the first determination pattern which is used by the tailgating determiner 150. In the example illustrated in FIG. 2, it is assumed that the host vehicle M is traveling at a speed VM on a lane L1 extending in an X-axis direction defined by road marking lines LL and LR. This is the same of below description of other determination patterns. In the example illustrated in FIG. 2, another vehicle m1 is traveling at a speed Vm1 behind the host vehicle M.

The imaging controller 160 operates the driver monitoring camera 70 while the host vehicle M is traveling and causes the driver monitoring camera 70 to capture an image (hereinafter referred to as a cabin image) such that an occupant state in the cabin is detected as a first aspect. For example, the driver monitoring camera 70 captures a cabin image with a viewing angle in which occupants sitting on a driver's seat, a passenger's seat, and a rear seat appear. The cabin image captured by the driver monitoring camera 70 includes an outside area AR1 through the rear windshield RWS or the right and left side windshields SWS in addition to the cabin.

The imaging controller 160 analyzes the captured cabin image, estimates a posture or sight, a face direction, an expression, and the like of an occupant (a driver) sitting on the driver's seat, and returns the occupant to a state suitable for driving by causing the HMI controller 130 to output a warning or an alarm via the display 32 or the speaker 34 when the driver does not monitor the surroundings of the host vehicle M (for example, a travel direction of the host vehicle M) and is not in a state suitable for manual driving (for example, when it is determined that the driver seems to doze) on the basis of the result of estimation. This process may be performed by the driving controller 120 instead of the imaging controller 160.

The tailgating determiner 150 analyzes the cabin image captured by the driver monitoring camera 70 and determines whether another vehicle m1 is included in the outside area AR1 in the cabin image. For example, the tailgating determiner 150 determines whether at least a part of another vehicle m1 is included in the outside area AR1 on the basis of a result of a process of matching color information included in the image or feature information such as a shape and a size based on edge analysis or the like with feature information for recognizing a vehicle in advance. When at least a part of the other vehicle m1 appears in the area AR1, it is predicted that the other vehicle m1 is approaching the host vehicle M. Accordingly, when it is determined that the other vehicle m1 appears in the area AR1, the tailgating determiner 150 determines that the host vehicle M is being tailgated by the other vehicle m1 (the other vehicle m1 is performing a tailgating operation).

In the first determination pattern, when the host vehicle M is in a traffic jam or waiting for signal or is traveling at a low speed, there is a high likelihood that another vehicle which is not performing a tailgating operation will be included in the cabin image. Accordingly, when the speed VM of the host vehicle M is equal to or higher than a predetermined speed and another vehicle m1 appears in the cabin image, the tailgating determiner 150 may determine that the host vehicle M is being tailgated by the other vehicle m1. Accordingly, it is possible to more accurately determine whether the host vehicle M is being tailgated by another vehicle m1.

When a proportion of the other vehicle m1 in the outside area in the image is equal to or greater than a threshold value (a first threshold value) or when a frequency in which another vehicle m1 appears in the outside area within a predetermined time is equal to or greater than a threshold value (a second threshold value), the tailgating determiner 150 may determine that the host vehicle M is being tailgated by the other vehicle m1. When a period of time in which another vehicle m1 continues to appear in the cabin image is equal to or greater than a predetermined time, the tailgating determiner 150 may determine that the host vehicle M is being tailgated by the other vehicle m1. With the first determination pattern, since it is determined whether the host vehicle M is being tailgated by another vehicle m1 using an image captured by the driver monitoring camera 70 that detects a driver state of the host vehicle M as a main function thereof, a dedicated camera for detecting tailgating does not need to be mounted in the host vehicle M and thus it is possible to decrease device costs. By setting determination conditions based on an image captured by the driver monitoring camera 70, it is possible to more accurately determine whether another vehicle m1 appearing in the image captured by the driver monitoring camera 70 is performing a tailgating operation.

Second Determination Pattern

A second determination pattern will be described below. The second determination pattern is a pattern for determining whether the host vehicle M is being tailgated by another vehicle m1 using a side view image or a side rearview image (hereinafter referred to as a side rearview image) captured by the BSI camera 72.

Figure 3:
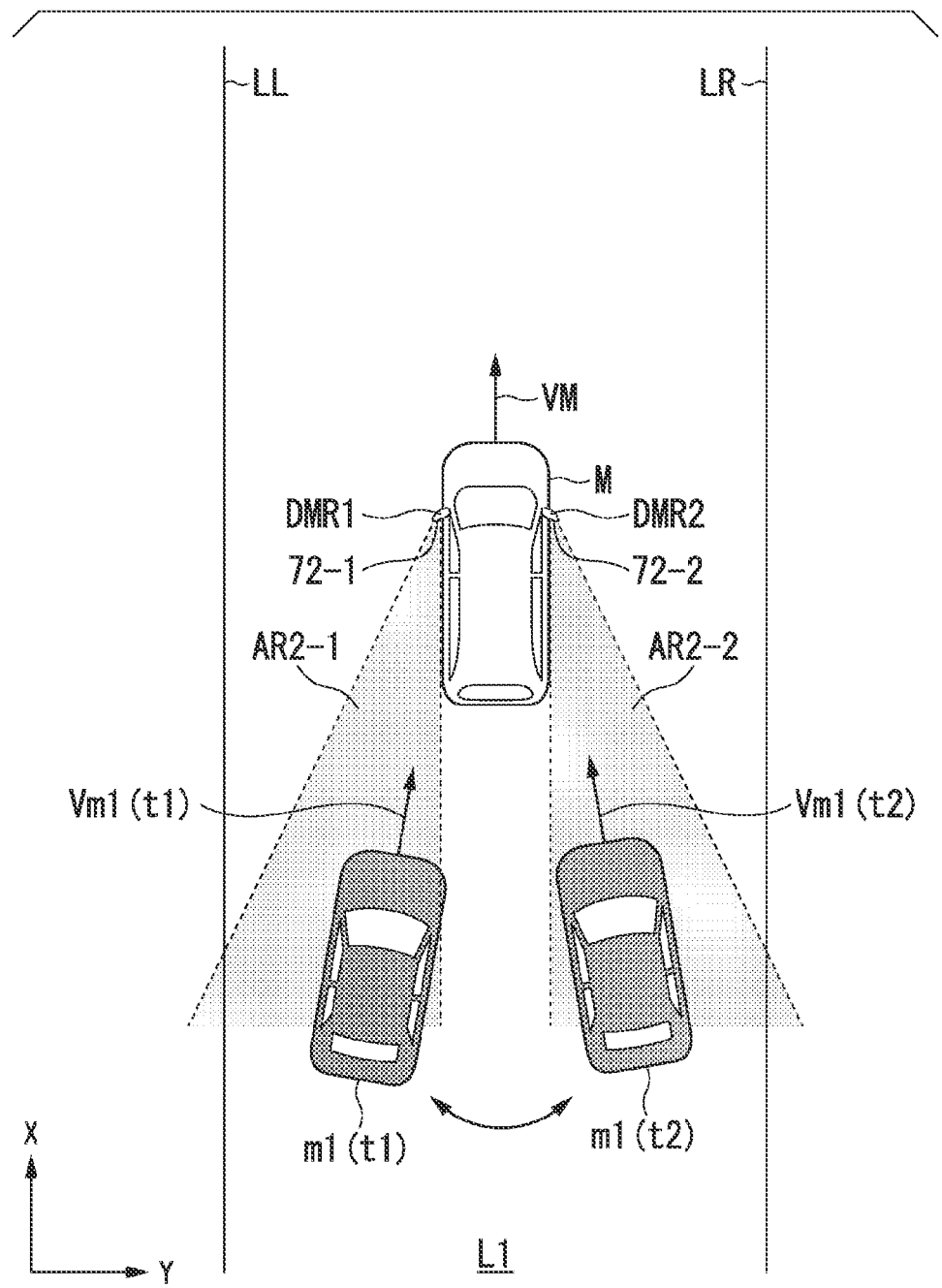
FIG. 3 is a diagram illustrating a second determination pattern in the tailgating determiner.

FIG. 3 is a diagram illustrating the second determination pattern which is used by the tailgating determiner 150. In the example illustrated in FIG. 3, time t2 is later than time t1. It is assumed that a position and a speed of another vehicle m1 at time t* are defined as m1(t*) and Vm1(t*). The same is true of the following description.

In the example illustrated in FIG. 3, BSI cameras 72-1 and 72-2 are attached to a left door mirror DMR1 and a right door mirror DMR2 of the host vehicle M. In FIG. 3, imaging areas (viewing angles) AR2-1 and AR2-2 which are imaged by the BSI cameras 72-1 and 72-2 are illustrated. The BSI camera 72-1 images the rear-left area AR2-1 of the host vehicle M and the BSI camera 72-2 images the rear-right area AR2-2 of the host vehicle M. In this embodiment, a plurality of BSI cameras with different viewing angles may be attached to the right and left sides.

The imaging controller 160 operates the BSI cameras 72-1 and 72-2 while the host vehicle M is traveling and causes the BSI cameras 72-1 and 72-2 to capture images of the rear-left and rear-right areas AR2-1 and AR2-2 as the first function. The imaging controller 160 may operate the BSI cameras 72-1 and 72-2 while the host vehicle M is traveling or may operate the BSI cameras 72-1 and 72-2 when the host vehicle M performs predetermined behavior such as lane change. The imaging controller 160 analyzes the captured side rearview images and determines whether another vehicle m1 is included in the side rearview images. When it is determined that another vehicle m1 is included in the side rearview images, the HMI controller 130 displays a predetermined image (for example, an image indicating that the other vehicle m1 is approaching the side rear portion (the blind spot) of the host vehicle M) on the BSI indicator 36. For example, the HMI controller 130 displays a predetermined image on the mirror surface of the door mirror DMR1 when another vehicle m1 is included in the image acquired by imaging the area AR2-1 and displays a predetermined image on the door mirror DMR2 when another vehicle m1 is included in the image acquired by imaging the area AR2-2.

When the function of detecting another vehicle in a blind spot is achieved by the plurality of BSI cameras 72-1 and 72-2 as described above, the tailgating determiner 150 determines whether the host vehicle M is being tailgated by the other vehicle m1 depending on whether at least a part of the other vehicle m1 is included in the images captured by the plurality of BSI cameras 72-1 and 72-2. For example, when at least a part of the same other vehicle m1 appears in both a side rearview image of the imaging area AR2-1 captured by the BSI camera 72-1 and a side rearview image of the imaging area AR2-2 captured by the BSI camera 72-2 in a predetermined time, the tailgating determiner 150 determines that the host vehicle M is being tailgated by the other vehicle m1. For example, the tailgating determiner 150 compares feature information such as color or shape of the other vehicle m1 in the side rearview images captured by the BSI cameras 72-1 and 72-2 and determines that the vehicles are the same other vehicle m1 when a degree of matching of the feature information is equal to or greater than a threshold value.

In the example illustrated in FIG. 3, when a difference between time t1 at which the same other vehicle m1 appears in the area AR2-1 and time t2 at which the same other vehicle m1 appears in the area AR2-2 is less than a threshold value, the tailgating determiner 150 determines that the host vehicle M is being tailgated by the other vehicle m1. When the number of times the other vehicle m1 alternately appear in the area AR2-1 and the area AR2-2 in a predetermined time is equal to or greater than a predetermined number, the tailgating determiner 150 may determine that the host vehicle M is being tailgated by the other vehicle m1 meandering.

When the speed VM of the host vehicle M is equal to or less than a predetermined speed, another vehicle m1 may appear in a side rearview image for the reasons such as a traffic jam other than the tailgating. Accordingly, when the speed VM of the host vehicle M is equal to or greater than a predetermined speed and the same other vehicle m1 appears in the area AR2-1 and the area AR2-2 in a predetermined time, the tailgating determiner 150 may determine that the host vehicle M is being tailgated by the other vehicle m1.

With the second determination pattern, since it is determined whether the host vehicle M is being tailgated by another vehicle m1 using an image captured by the BSI camera 72 imaging a side view or a side rearview of the host vehicle M as a main function, a dedicated camera for detecting tailgating does not need to be mounted in the host vehicle M and thus it is possible to decrease device costs. By setting determination conditions based on the BSI camera 72, it is possible to more accurately determine whether another vehicle m1 appearing in the image captured by the BSI camera 72 is performing a tailgating operation. By performing tailgating determination using a plurality of BSI cameras 72-1 and 72-2, it is possible to detect a more wicked tailgating operation such as a meandering operation.

Third Determination Pattern

A third determination pattern will be described below. The third determination pattern is a pattern for determining whether the host vehicle M is being tailgated by another vehicle m1 using an image (a rearview image) captured by the rear camera 74.

Figure 4:
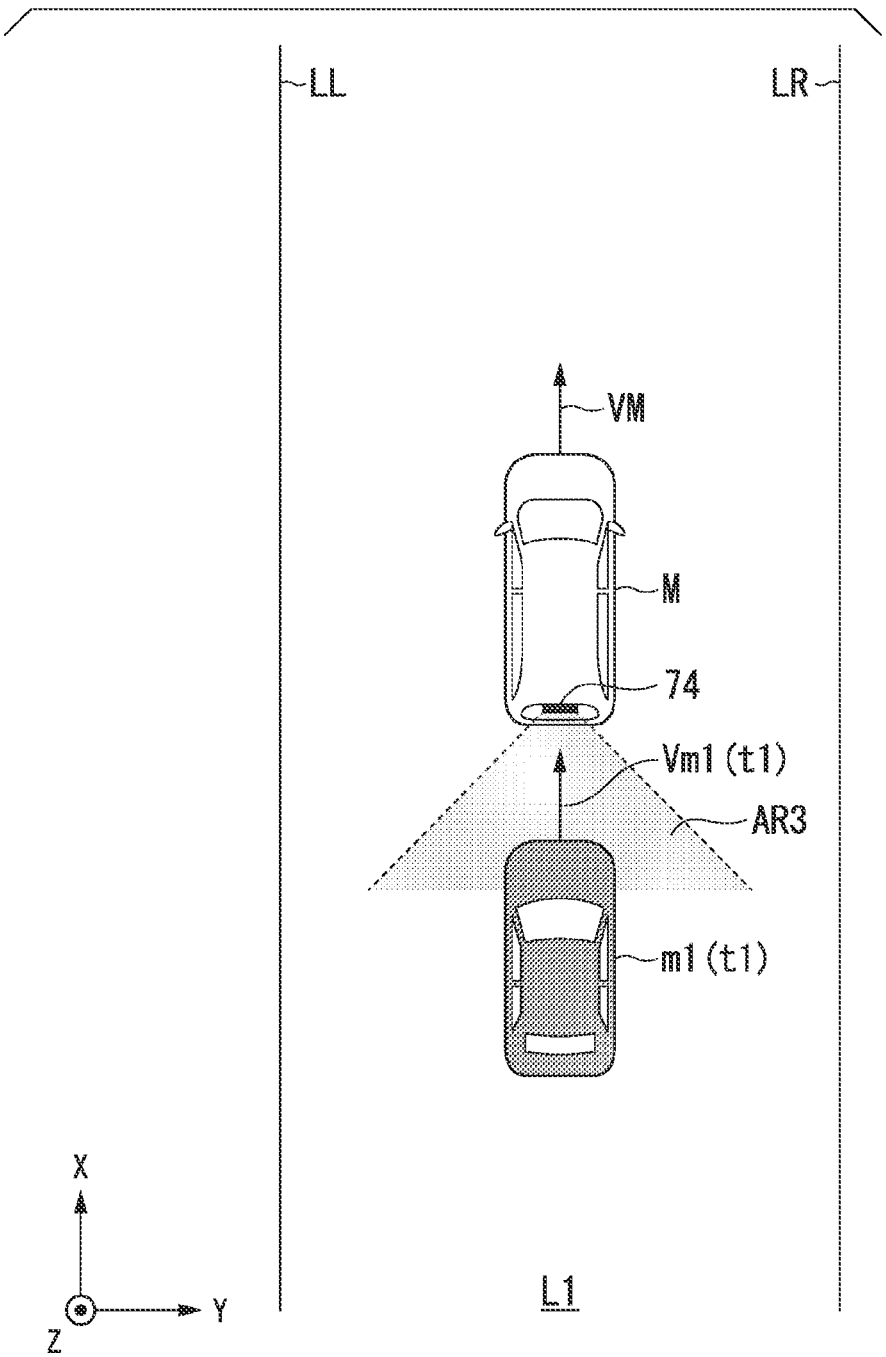
FIG. 4 is a (first) diagram illustrating a third determination pattern in the tailgating determiner.
Figure 5:
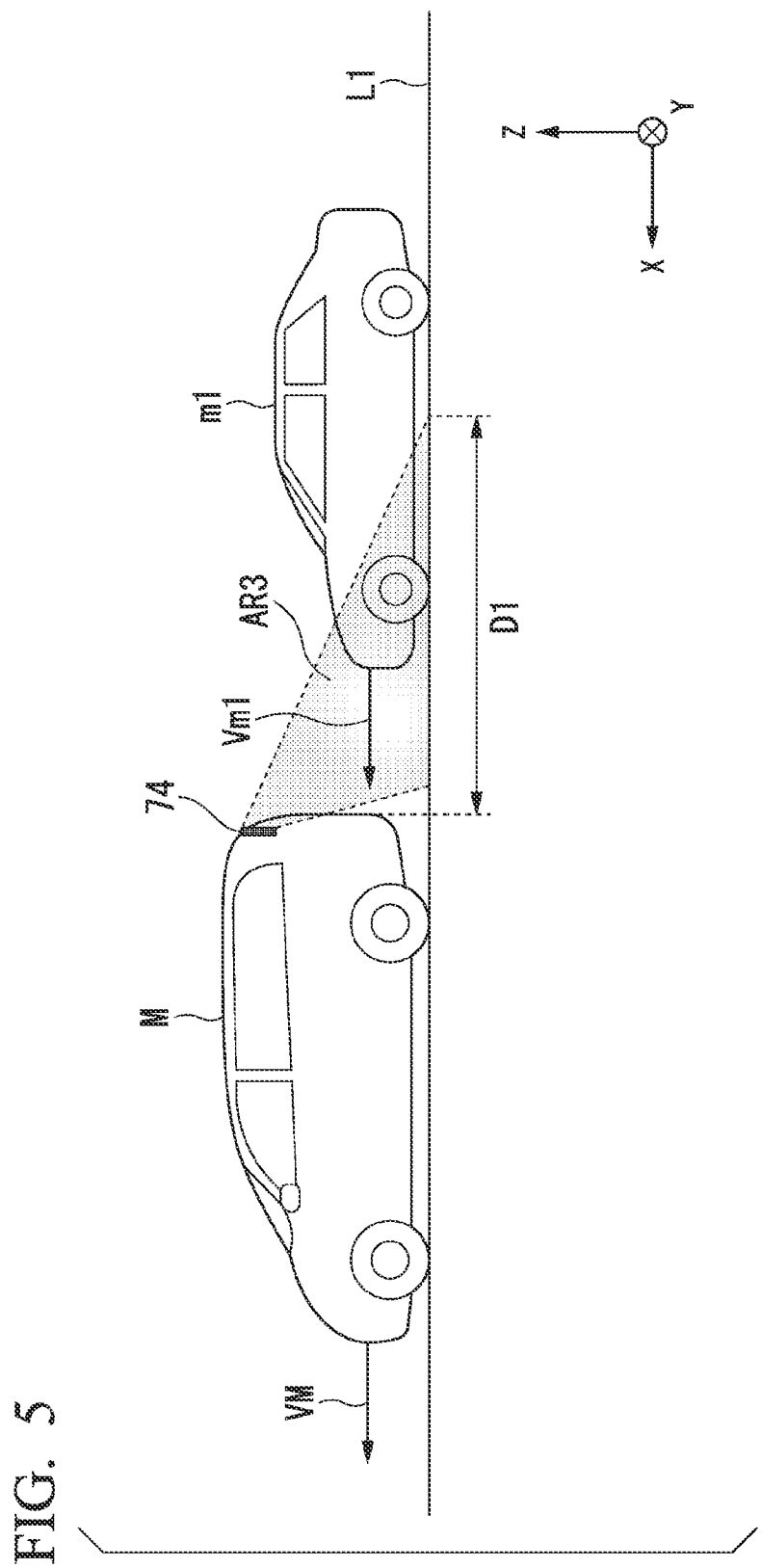
FIG. 5 is a (second) diagram illustrating the third determination pattern in the tailgating determiner.

FIGS. 4 and 5 are (first and second) diagrams illustrating the third determination pattern which is used by the tailgating determiner 150. A positional relationship between the host vehicle M and another vehicle m1 in an XY plane (in a top view) is illustrated in the example of FIG. 4, and a positional relationship between the host vehicle M and another vehicle m1 in an XZ plane (in a side view) is illustrated in the example of FIG. 5. In the example illustrated in FIGS. 4 and 5, the rear camera 74 is attached to an upper part of a rear end of the vehicle body of the host vehicle M.

For example, when the shift lever included in the driving operator 80 is switched to a shift position correlated with a driving mode in which the host vehicle M moves in reverse, the imaging controller 160 operates the rear camera 74 such that an image (hereinafter referred to as a rearview image) for detecting an object in a rear area AR3 of the host vehicle M is captured as the first function. The HMI controller 130 displays the captured rearview image on the display 32. Accordingly, when it is intended for the host vehicle M to move in reverse, a driver can drive the host vehicle M to move in reverse while viewing the image displayed on the display 32. When it is determined that there is a likelihood that the host vehicle M will come into contact with a rear object on the basis of the rearview image, the HMI controller 130 may notify of a warning using the HMI 30. When it is determined that there is a likelihood that the host vehicle M will come into contact with a rear object on the basis of the rearview image, the driving controller 120 may perform control for emergently stopping the host vehicle M.

When the host vehicle M does not move in reverse and predetermined conditions are satisfied, the imaging controller 160 may operate the rear camera 74. The predetermined conditions may include, for example, a case in which another vehicle m1 is included in an image captured by at least one of the driver monitoring camera 70, the BSI camera 72, and the rear camera 74. The predetermined conditions may include, for example, a case in which an instruction to operate the rear camera 74 based on an occupant's operation is received by the HMI 30. The predetermined conditions may include, for example, a case in which the host vehicle M is traveling in predetermined behavior such as a case in which the speed of the host vehicle M is equal to or greater than a predetermined speed or when the steering angle of the steering wheel is equal to or greater than a predetermined angle.

For example, in a situation in which the host vehicle M is not moving in reverse, the tailgating determiner 150 analyzes an image of the rear area AR3 captured by the rear camera 74 and determines whether another vehicle m1 is included in the rearview image. The rearview image captured by the rear camera 74 is mainly used when the host vehicle M parks through reverse movement or the like and has a narrower viewing angle than that of other cameras (more specifically, a distance D1 from the host vehicle M is shorter). Accordingly, when another vehicle m1 appears in the rearview image, it can be predicted that the other vehicle m1 is approaching the host vehicle M. As a result, the tailgating determiner 150 determines that the host vehicle M is being tailgated by the other vehicle m1 when the other vehicle m1 is included in the rearview image.

In the third determination pattern, when the host vehicle M is in a traffic jam or waiting for signal or is traveling at a low speed, there is a high likelihood that another vehicle which is not performing a tailgating operation will be included in the rearview image. Accordingly, when the speed VM of the host vehicle M is equal to or higher than a predetermined speed and another vehicle m1 appears in the rearview image, the tailgating determiner 150 may determine that the host vehicle M is being tailgated by the other vehicle m1. Accordingly, it is possible to more accurately determine whether the host vehicle M is being tailgated by another vehicle.

With the third determination pattern, since it is determined whether the host vehicle M is being tailgated by another vehicle m1 using an image captured by the rear camera 74 that detects an object behind the host vehicle M as a main function thereof, a dedicated camera for detecting tailgating does not need to be mounted in the host vehicle M and thus it is possible to decrease device costs. By effectively utilizing the narrow viewing angle of the rear camera 74, it is possible to more appropriately determine a vehicle performing a tailgating operation (an approaching vehicle).

Fourth Determination Pattern

A fourth determination pattern will be described below. The fourth determination pattern is a pattern for determining whether the host vehicle M is being tailgated by another vehicle based on a distance between the host vehicle M and a preceding other vehicle and a distance between the host vehicle M and a following other vehicle when the other vehicles are present in front of and behind the host vehicle M.

Figure 6:
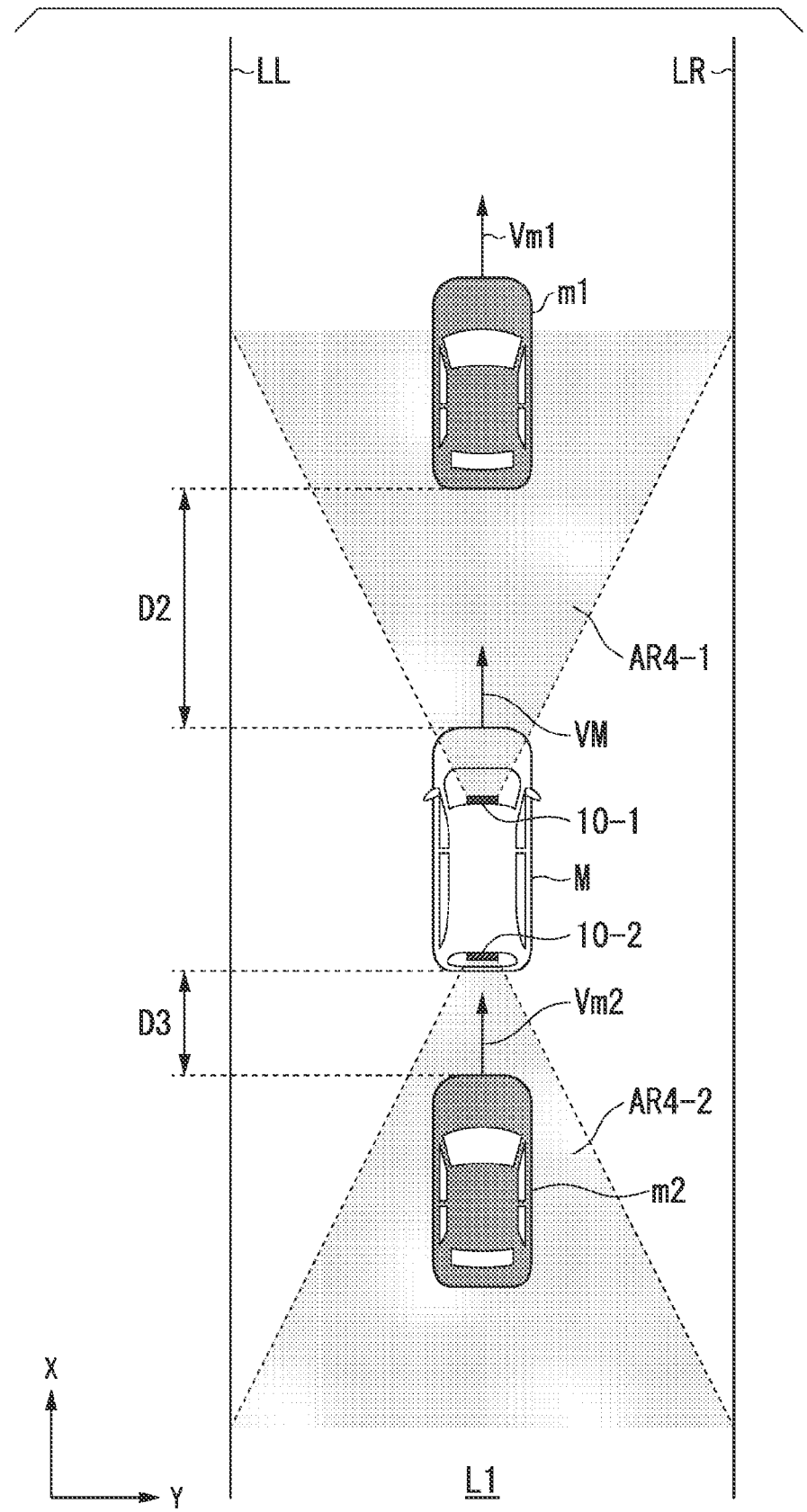
FIG. 6 is a diagram illustrating a fourth determination pattern in the tailgating determiner.

FIG. 6 is a diagram illustrating the fourth determination pattern which is used by the tailgating determiner 150. In the example illustrated in FIG. 6, a camera 10-1 for recognizing an object in front of the host vehicle M and a camera 10-2 for recognizing an object behind the host vehicle M are provided. In the example illustrated in FIG. 6, another vehicle m1 (an example of a first other vehicle) is traveling at a speed Vm1 in front of the host vehicle M, and another vehicle m2 is traveling at a speed Vm2 behind the host vehicle M. In the fourth determination pattern, the other vehicle m1 is an example of the "first other vehicle," and the other vehicle m2 is an example of the "second other vehicle."

The imaging controller 160 operates the cameras 10-1 and 10-2 to capture a front view image and a rearview image of the host vehicle M such that the purpose of detecting an object near the host vehicle M can be achieved to perform driving control of the driving controller 120 as the first function. The object recognizer 110 recognizes an inter-vehicle distance D2 between the host vehicle M and another vehicle m1 (a distance from the front end of the host vehicle M to the rear end of the other vehicle m1) when the other vehicle m1 in an area AR4-1 in front of the host vehicle M has been recognized on the basis of an image captured by the camera 10-1 (hereinafter referred to as a first driving-control image). The object recognizer 110 recognizes an inter-vehicle distance D3 between the host vehicle M and another vehicle m2 (a distance from the rear end of the host vehicle M to the front end of the other vehicle m2) when the other vehicle m2 in an area AR4-2 behind the host vehicle M has been recognized on the basis of an image captured by the camera 10-2 (hereinafter referred to as a second driving-control image). The object recognizer 110 recognizes road marking lines LL and LR on the basis of one or both of the first driving-control image and the second driving-control image. The driving controller 120 performs driving control such that the host vehicle M travels in the lane L1 without coming into contact with the other vehicles m1 and m2 on the basis of the result of recognition from the object recognizer 110.

The tailgating determiner 150 calculates a difference between the inter-vehicle distance D2 and the inter-vehicle distance D3 recognized by the object recognizer 110 and determines that the host vehicle M is being tailgated by the other vehicle of which the distance from the host vehicle M is smaller when the difference is equal to or greater than a threshold value. In the example illustrated in FIG. 6, it is assumed that the difference between the inter-vehicle distances D2 and D3 is equal to or greater than the threshold value. In this case, it is determined that the other vehicle m2 of which the distance from the host vehicle M is smaller is tailgating the host vehicle M.

When the difference between the inter-vehicle distances D2 and D3 is equal to or greater than the threshold value and the distance of the smaller inter-vehicle distance is equal to or greater than a predetermined distance, the tailgating determiner 150 may not determine that the corresponding other vehicle is not a vehicle performing a tailgating operation.

In the fourth determination pattern, when the host vehicle M is in a traffic jam or waiting for signal or is traveling at a low speed, there is a high likelihood that another vehicle not performing a tailgating operation will be included in the first driving-control image and the second driving-control image for the host vehicle M. Accordingly, when the speed VM of the host vehicle M is equal to or higher than a predetermined speed and the difference between the inter-vehicle distances D2 and D3 is equal to or greater than a threshold value, the tailgating determiner 150 may determine that the other vehicle with a smaller distance from the host vehicle M is tailgating the host vehicle M.

With the fourth determination pattern, since it is determined whether the host vehicle M is being tailgated by another vehicle m1 using an image captured by a camera 10 that captures an image for detecting an object near the host vehicle M to perform driving control using the driving controller 120 as a main function thereof, a dedicated camera for detecting tailgating does not need to be mounted in the host vehicle M and thus it is possible to decrease device costs.

Fifth Determination Pattern

A fifth determination pattern will be described below. The fifth determination pattern is a pattern for determining whether the host vehicle M is being tailgated by another vehicle m1 based on a change in behavior of the host vehicle M or the other vehicle m1 in addition to (or instead of) at least one of the first to fourth determination patterns.

Figure 7:
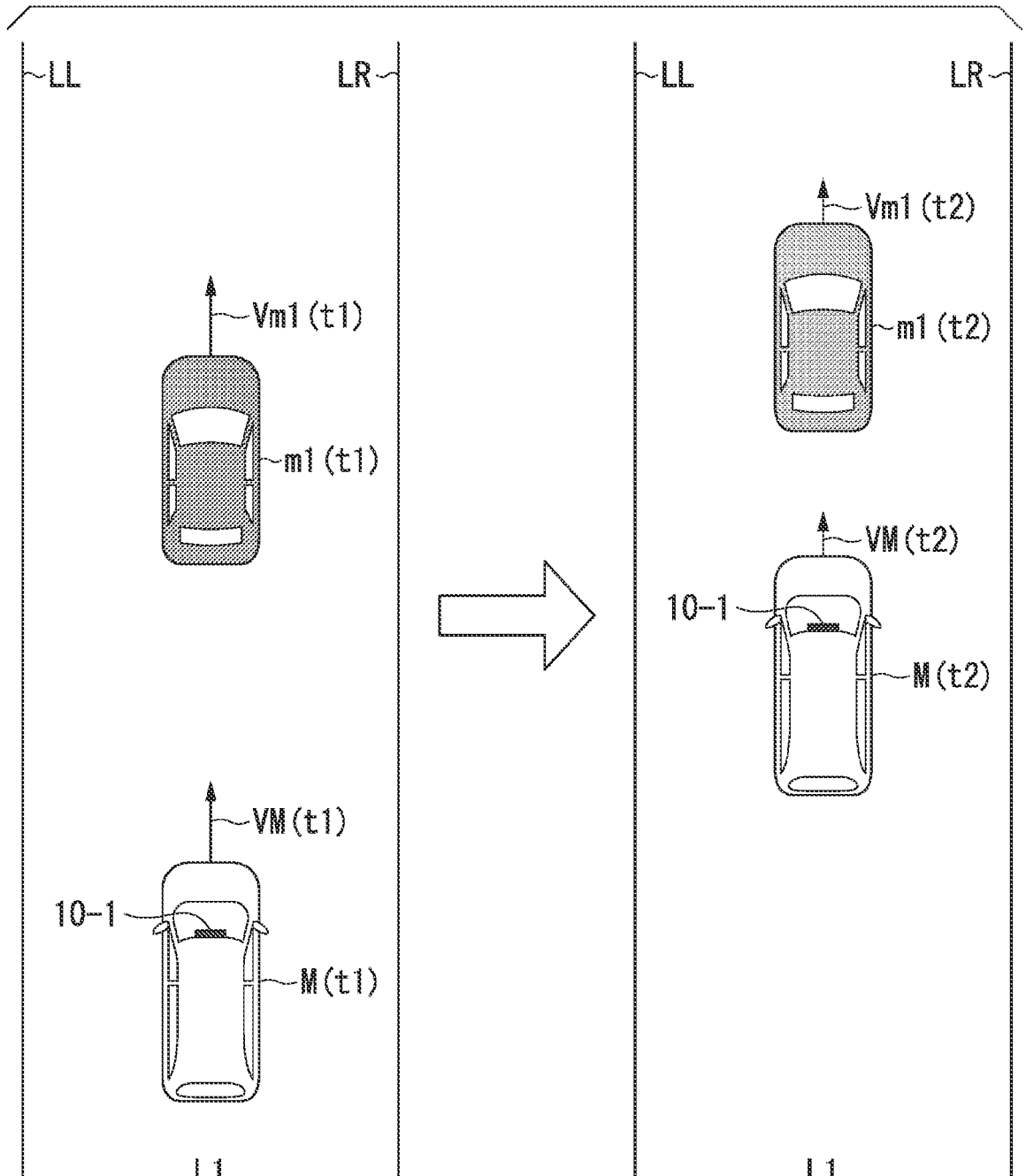
FIG. 7 is a diagram illustrating a fifth determination pattern in the tailgating determiner.

FIG. 7 is a diagram illustrating the fifth determination pattern which is used by the tailgating determiner 150. In the example illustrated in FIG. 7, a change in a positional relationship between the host vehicle M and another vehicle m1 traveling in front of the host vehicle M at times t1 and t2 is illustrated. The same is true of FIG. 8 which will be described later.

In the fifth determination pattern, the vehicle sensor 40 of the host vehicle M detects a load of the front wheels while the host vehicle M is traveling. When another vehicle m1 decelerates from a speed Vm1(t1) at time t1 to a speed Vm1(t2) at time t2 in FIG. 7, the host vehicle M decelerates from a speed VM(t1) to a speed VM(t2).

The tailgating determiner 150 calculates a rate of change in load between at time t1 and at time t2 on the basis of the loads applied to the front wheels at times t1 and t2 detected by the vehicle sensor 40. The tailgating determiner 150 increases the number of times the rate of change becomes equal to or greater than a predetermined rate by 1 when the rate of change is equal to or greater than the predetermined rate. The tailgating determiner 150 performs the same process after time t2 and determines that the host vehicle M is being tailgated by the other vehicle m1 when the number of times the rate of change becomes equal to or greater than the predetermined rate in a predetermined period is equal to or greater than a predetermined number or when the frequency in which the rate of change is equal to or greater than the predetermined rate is equal to or greater than a threshold value.

For example, when the host vehicle is traveling in a traffic jam or the like, the acceleration/deceleration frequency of the other vehicle m1 is likely to increase and there is a high likelihood that the host vehicle M is not being tailgated by the other vehicle m1 in such a situation. Accordingly, when the host vehicle M is traveling at the speed VM equal to or greater than a predetermined speed and when the number of times the rate of change becomes equal to or greater than the predetermined rate in a predetermined period is equal to or greater than a predetermined number or when the frequency in which the rate of change is equal to or greater than the predetermined rate is equal to or greater than a threshold value, the tailgating determiner 150 may determine that the host vehicle M is being tailgated by the other vehicle m1.

In the determination process based on the fifth determination pattern, a rate of change of the speed of the host vehicle M may be used instead of the rate of change of the load applied on the front wheels. The determination process based on the fifth determination pattern may be performed, for example, when another vehicle m1 is included in an image captured by the camera 10-1 that images a front view of the host vehicle M. With the fifth determination pattern, it is possible to more appropriately determine a tailgating operation on the basis of the frequency of acceleration/deceleration of the host vehicle M.

Sixth Determination Pattern

A sixth determination pattern will be described below. Similarly to the fifth determination pattern, the sixth determination pattern is a pattern for determining whether the host vehicle M is being tailgated by another vehicle m1 on the basis of a change in behavior of the host vehicle M or the other vehicle m1. Specifically, the sixth determination pattern is a pattern for determining a tailgating operation on the basis of a change of an amount of steering of the host vehicle M instead of a change in speed (a rate of change in load applied to the front wheels) of the host vehicle M.

Figure 8:
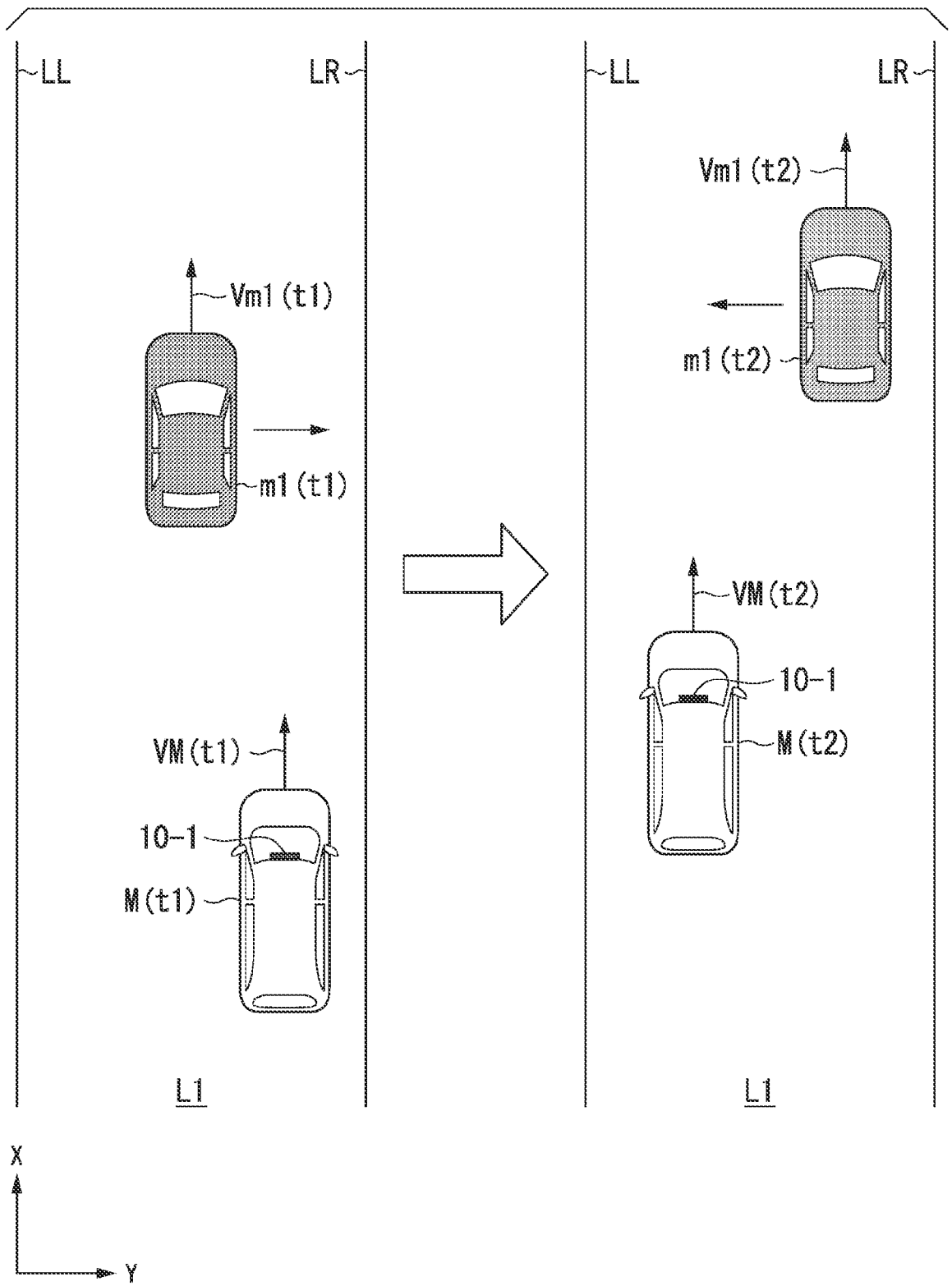
FIG. 8 is a diagram illustrating a sixth determination pattern in the tailgating determiner.

FIG. 8 is a diagram illustrating the sixth determination pattern which is used by the tailgating determiner 150. In the sixth determination pattern, the vehicle sensor 40 detects an amount of steering of the host vehicle M which is traveling. The operation detector of the driving operator 80 detects a steering angle of the steering wheel.

In the sixth determination pattern, it is assumed that the host vehicle M moves to the right side of a lane L1 to overtake a front other vehicle m1 at time t1. In this situation, the other vehicle m1 is moving to the right side of the lane L1. At time t2, the host vehicle M moves to the left side of the lane L1 to overtake the other vehicle m1. In this situation, the other vehicle m2 moves to the left side of the lane in which the host vehicle M is traveling.

The tailgating determiner 150 acquires a rate of change of an amount of steering (a rate of change of a steering angle) of the host vehicle based on the change in behavior. The tailgating determiner 150 acquires the rate of change in the same way even after time t2. When a state in which the rate of change of the amount of steering (an amount of movement in the lateral direction (the Y-axis direction)) of the host vehicle M is equal to or greater than a predetermined rate is achieved a predetermined number of times or more in a first predetermined time or is achieved a predetermined number of times or less in a second predetermined time (first predetermined time>second predetermined time), the tailgating determiner 150 determines that the host vehicle M is being tailgated by the other vehicle m1 (specifically, movement of the host vehicle is hindered).

The determination process based on the sixth determination pattern may be performed, for example, when the speed of the host vehicle M is equal to or greater than a predetermined speed or when another vehicle m1 is included in an image captured by a camera 10-1 that images a front view of the host vehicle M. With the sixth determination pattern, it is possible to more appropriately determine a tailgating operation on the basis of the rate of change or the frequency of steering of the host vehicle M.

Each of the first to sixth determination patterns may be combined with a part or the whole of another determination pattern. In addition to (or instead of) the camera, the radar 12 or the LIDAR 14 may be used to detect another vehicle in each of the first to sixth determination patterns. The determination process based on the first to sixth determination patterns may be performed on another vehicle which is traveling beside the host vehicle M or another vehicle which has overtaken the host vehicle M. The determination process based on the first to sixth determination patterns may not be performed, for example, when an object in which the host vehicle M is likely to stop such as a traffic signal, a crossing, or a crosswalk is present within a predetermined distance in the travel direction of the host vehicle M.

Flow of Processes

Figure 9:
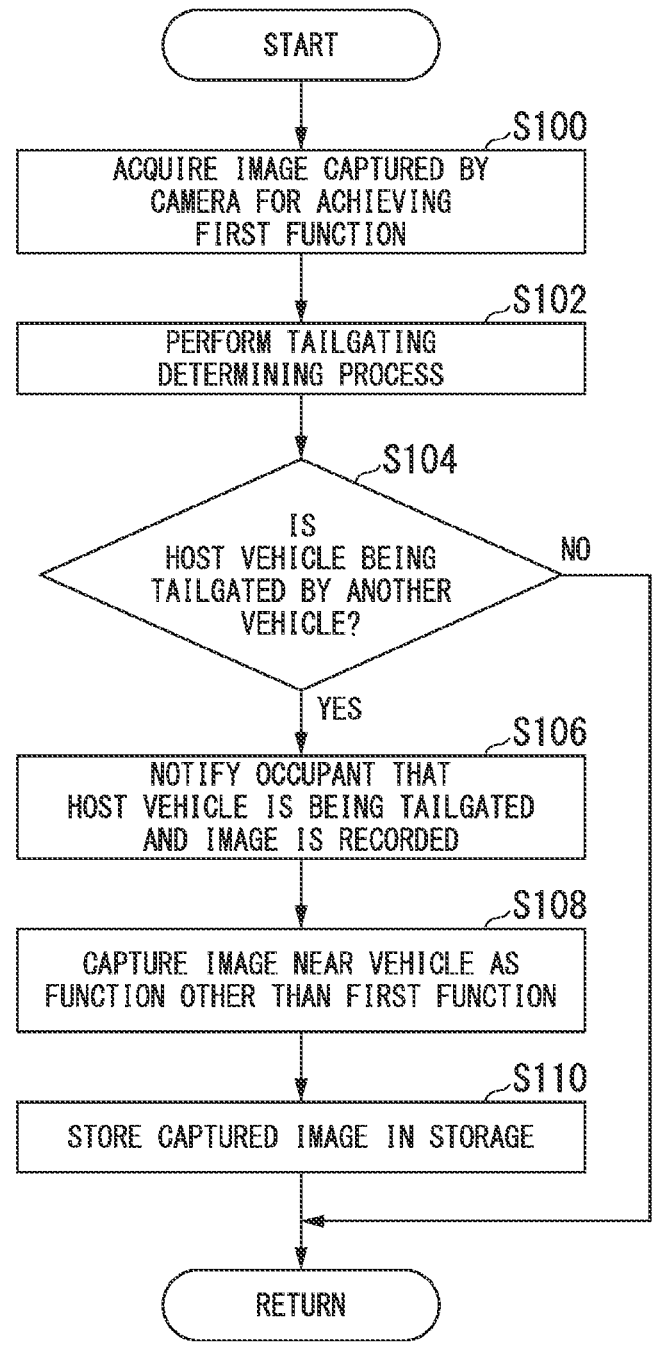
FIG. 9 is a flowchart illustrating an example of a flow of processes which are performed by a recording control device according to the embodiment.

FIG. 9 is a flowchart illustrating an example of a flow of processes which are performed by a recording control device according to an embodiment. In the following description, a tailgating determining process and an information storage process of storing a captured image or the like will be mainly described out of processes which are performed by the recording control device. The processes in this flowchart may be repeatedly performed, for example, in a predetermined cycle or at predetermined timings. In the example illustrated in FIG. 9, the image acquirer 140 acquires an image captured by a camera for achieving a first function (Step S100). Then, the tailgating determiner 150 performs a tailgating determining process using the acquired image (Step S102) and determines whether a host vehicle is being tailgated by the other vehicle on the basis of the result of determination (Step S104). In the process of Step S102, the tailgating determiner 150 determines a tailgating operation using at least one of the first to fifth determination patterns.

When it is determined that the host vehicle is being tailgated by the other vehicle, the HMI controller 130 notifies an occupant that the host vehicle is being tailgated by the other vehicle and that the image is to be recorded by outputting information indicating the facts from the HMI 30 (Step S106). Then, the imaging controller 160 operates the camera for the purpose other than the first function to image the surroundings of the host vehicle (Step S108). The storage controller 170 stores the image captured by the imaging controller 160 in the storage 180 (Step S110). The processes of Steps S108 and S110 may be repeatedly performed until a predetermined period expires or tailgating of another vehicle ends. Accordingly, the flow of processes in this flowchart ends. When it is determined in Step S104 that the host vehicle is not being tailgated by another vehicle, the flow of processes in this flowchart ends.

According to the aforementioned embodiment, since the information recording device includes: the image acquirer 140 configured to acquire an image which is captured by an imager (the first to fourth imagers) mounted in a host vehicle M to perform a first function; the tailgating determiner 150 configured to determine whether the host vehicle M is being tailgated by another vehicle on the basis of the image acquired by the image acquirer 140; the imaging controller 160 configured to cause the imager to capture an image of the surroundings of the host vehicle M as a function other than the first function when the tailgating determiner 150 determines that the host vehicle M is being tailgated by the other vehicle; and the storage controller 170 configured to store the image captured by the imager in a storage 180, it is possible to decrease device costs and to more appropriately determine a tailgating operation.

Specifically, according to the aforementioned embodiment, by capturing an image using a camera which is mounted in the host vehicle and which has a first function even when a tailgating operation is determined to have been performed, it is possible to divert an existing camera and to image and record a tailgating operation at low costs without additional costs. Since a camera having a first function is normally set to a long guaranteed period of about 10 years, it is possible to record a more accurate tailgating operation image using the camera. According to the embodiment, when the speed of the host vehicle M is less than a predetermined speed such as a traffic jam and another vehicle is included in an image, it is not determined to be a tailgating operation and thus it is possible to more appropriately determine a tailgating operation.

The aforementioned embodiment can be expressed as follows:
an information recording device including:
a storage device that stores a program; and
a hardware processor,
wherein the hardware processor is configured to execute the program stored in the storage device to perform:
acquiring an image which is captured by an imager mounted in a host vehicle to perform a first function;
determining whether the host vehicle is being tailgated by another vehicle on the basis of the acquired image;
causing the imager to capture an image of surroundings of the host vehicle as a function other than the first function when it is determined that the host vehicle is being tailgated by the other vehicle; and
storing the image captured by the imager in a storage.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information recording device comprising:
a processor that executes instructions to:
acquire respective images which are captured by a plurality of cameras mounted in a host vehicle to perform a first function;
determine whether the host vehicle is being tailgated by an other vehicle according to a predetermined determination pattern for each of the respective images captured by the plurality of cameras;
cause a camera of the plurality of cameras to capture an image of surroundings of the host vehicle as a function other than the first function in response to determining that the host vehicle is being tailgated by the other vehicle; and
store each of the respective images to a storage device,
wherein the first function is a function of detecting at least the other vehicle which is present in a blind spot of the host vehicle, and
wherein when the function of detecting that the other vehicle which is present in the blind spot on each side is achieved by a first camera of the plurality of cameras that captures a first blind spot area on a rear right side and a second camera of the plurality of cameras that captures a second blind spot area on a rear left side among the plurality of cameras mounted in the host vehicle, the processor determines whether the host vehicle is being tailgated based at least in part on the other vehicle being present in each of the respective images captured by the first camera and the second camera within a predetermined time,
wherein the processor is a first processor, the instructions are first instructions, and wherein the host vehicle includes a second processor that executes second instructions to control one or both of steering and acceleration/deceleration, and
wherein the first function includes a function of detecting an object near the host vehicle such that the second processor, in response to executing the second instructions, performs driving control of the host vehicle.

2. The information recording device according to claim 1, wherein the first function is a function of detecting an occupant state in the host vehicle.

3. The information recording device according to claim 1, wherein the first function includes a function of detecting a rear object when the host vehicle moves in reverse.

4. The information recording device according to claim 1, wherein the processor executes instructions to determine whether the host vehicle is being tailgated by the other vehicle when a speed of the host vehicle is equal to or higher than a predetermined speed.

5. The information recording device according to claim 1, wherein the is processor executes instructions to, when a first other vehicle is present in front of the host vehicle and a second other vehicle is present behind the host vehicle, determine whether the host vehicle is being tailgated based on a difference between a first distance between the host vehicle and the first other vehicle and a second distance between the host vehicle and the second other vehicle.

6. The information recording device according to claim 1, wherein the processor executes instructions to, when the other vehicle is present in front of the host vehicle, determine whether the host vehicle is being tailgated by the other vehicle based on a rate of change of a load applied to front wheels of the host vehicle or a rate of change of steering of the host vehicle.

7. An information recording method that is performed by a computer comprising at least one processor, the information recording method comprising:
- acquiring respective images which are captured by a plurality of cameras mounted in a host vehicle to perform a first function;
- determining whether the host vehicle is being tailgated by an other vehicle according to a predetermined determination pattern for each of the respective images captured by the plurality of cameras;
- causing a camera of the plurality of cameras to capture an image of surroundings of the host vehicle as a function other than the first function in response to determining that the host vehicle is being tailgated by the other vehicle; and
- storing each of the respective images to a storage device, wherein the first function is a function of detecting at least the other vehicle which is present in a blind spot of the host vehicle,
- when the function of detecting the other vehicle which is present in the blind spot on each side is achieved by a first camera of the plurality of cameras that captures a first blind spot area on a rear right side and a second camera of the plurality of cameras that captures a second blind spot area on a rear left side among the plurality of cameras mounted in the host vehicle, determining whether the host vehicle is being tailgated based at least in part on the other vehicle being present in each of the respective images captured by the first camera and the second camera within a predetermined time,
- wherein the processor is a first processor, the method comprises acts of first instructions, and wherein the host vehicle includes a second processor that executes second instructions to control one or both of steering and acceleration/deceleration, and
- wherein the first function includes a function of detecting an object near the host vehicle such that the second processor, in response to executing the second instructions, performs driving control of the host vehicle.

8. A non-transitory computer-readable storage medium that stores a program causing a computer comprising a processor to perform:
- acquiring respective which are captured by plurality of camera mounted in a host vehicle to perform a first function;
- determining whether the host vehicle is being tailgated by an other vehicle according to a predetermined determination pattern for each of the respective images captured by the plurality of cameras;
- causing a camera of the plurality of cameras to capture an image of surroundings of the host vehicle as a function other than the first function in response to determining that the host vehicle is being tailgated by the other vehicle; and
- storing each of the respective images to a storage device, wherein the first function is a function of detecting at least the other vehicle which is present in a blind spot of the host vehicle,
- when the function of detecting the other vehicle which is present in the blind spot on each side is achieved by a first camera of the plurality of cameras that captures a first blind spot area on a rear right side and a second camera of the plurality of cameras that captures a second blind spot area on a rear left side among the plurality of cameras mounted in the host vehicle, determining whether the host vehicle is being tailgated based at least in part on the other vehicle being present in each of the respective images captured by the first camera and the second camera within a predetermined time,
- wherein the processor is a first processor, the non-transitory computer-readable storage medium comprises acts of first instructions, and wherein the host vehicle includes a second processor that executes second instructions to control one or both of steering and acceleration/deceleration, and
- wherein the first function includes a function of detecting an object near the host vehicle such that the second processor, in response to executing the second instructions, performs driving control of the host vehicle.

\* \* \* \* \*